3,321,756
TRANSPONDER BEACONS
William F. Slaght, Ste.-Foy, Quebec, Canada, assignor to Her Majesty the Queen in right of Canada, as represented by Canadian Patents and Development Limited, National Research Council, Ottawa, Ontario, Canada
Filed Jan. 17, 1966, Ser. No. 521,171
19 Claims. (Cl. 343—6.8)

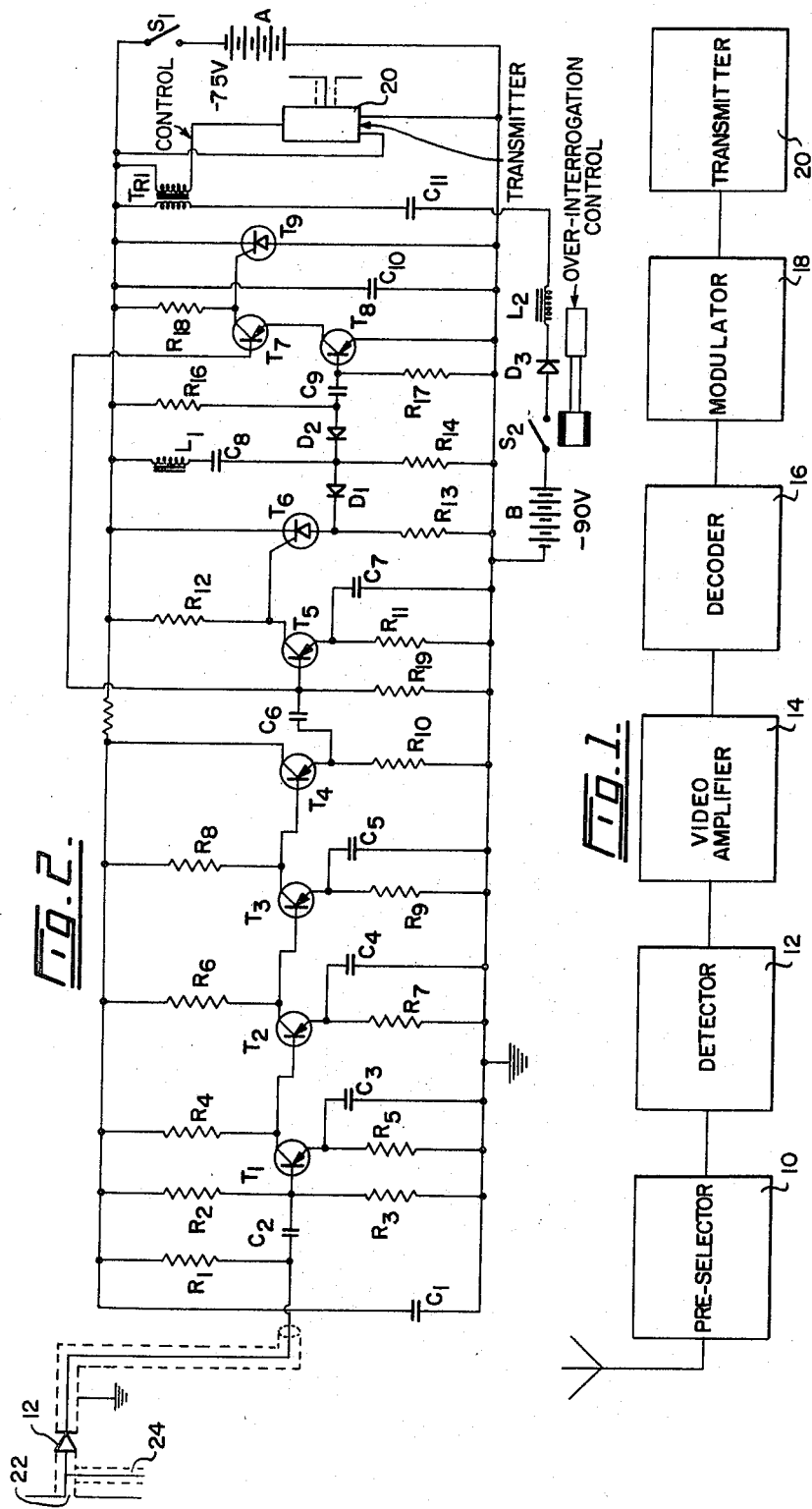

This invention relates to beacons for use in association with radar systems and particularly to transponder beacons adapted to be located in an object to be tracked and operable in response to interrogation signals from the radar to transmit artificial echoes thereof.

These beacons are primarily intended for location in rocket-propelled vehicles, unmanned balloons and similar vehicles used for high altitude research work enabling these objects to be tracked by suitable radar systems. The tracking capabilities of a radar are limited by the strength of the echo signal received by the radar. For a radar of given performance both its reliability in tracking and the maximum distance at which it can track may be greatly improved by the use of a transponder beacon. A transponder beacon is a passive device that responds to interrogation. When used to improve the performance of a radar the beacon is located in the object to be tracked and responds to the transmissions of the tracking radar as the interrogation signal. The response of the beacon is an artificial echo the strength of which is independent of the strength of the transmitted radar signal received at the beacon provided that the received signal exceeds a predetermined threshold value.

In view of the application of these beacons it will be clear that considerations of size, weight, power consumption, and in particular reliability are of major importance. Hitherto, however, the only commercially available beacons for these purposes had a number of draw-backs. With most of the prior art beacons the major draw-back has been their general unreliability whilst any that have been proved reliable usually have other features which render them unsuitable for the intended purpose. Of the few types of reliable beacons available these are all objectionable for present purposes on one or more grounds in that they use a large number of components, have temperature stability problems arising in part from the large number of components used, require well-regulated power supplies for their operation, have high power consumption, or are unsuitable for operation in the temperature range encountered in operation, i.e. —60° F. to +150° F.

As has been observed hereinbefore unreliability in operation has been a major draw-back in beacons developed heretofore. In many cases the unreliability has been attributable to malfunctioning of the beacon's decoder circuits. The function of the decoder is to cause the beacon to respond by transmitting only when it receives a prescribed or coded interrogation signal. Typical of the coded signals employed is a double pulse having a repetition frequency that can be selected from a wide range of possible values and having a time interval of three microseconds between the leading edges of the double pulse. The decoder is adapted to respond to the first pulse of the interrogation signal to produce a gate coincident with the second pulse which it passes to trigger a modulator of the beacon's transmitter. Operational experience has shown that these beacon failures occur most frequently just after launch of the vehicle carrying the beacon. Investigations of these failures have shown that when the radar signal is strong, as for example when the vehicle is in close proximity to the radar, the decoder produces spurious gates following the three microsecond gate. These spurious gates permit noise to be passed which acting as triggering signals in the normal recovery periods of the beacon's modulator cause runaway of the modulator.

The spurious gates were found to be a direct consequence of the circuit designs used in these decoders. It was also found that for the beacons to operate at maximum sensitivity a tolerance of ±0.1 microsecond is required on the time position of the second pulse of the interrogation signal; such a tolerance is however too extreme for the drift that can normally be expected in the types of radar to be used.

It is an object of the present invention to provide a beacon which is of compact and lightweight design, economical to manufacture, and reliable in operation.

Another object of the invention is to provide a beacon which has a very low power consumption and which is adapted to meet its operating specifications even with very large variations in its power supply voltage.

A further object of the invention is to provide a beacon having a high degree of reliability in the formation and timing of the delayed gate pulse and which has a high degree of temperature stability enabling the beacon to provide normal operation over a wide range of temperatures.

In accordance with the invention a beacon operable to generate an artificial echo in response to a double-pulse interrogation signal received from a radar associated therewith comprises means for receiving and detecting said interrogation signal; a decoder including a gate forming network operable to produce a delayed pulse in response to the application thereto of the first of said interrogation pulses and a gating circuit, said delayed pulse being applied to one input of said gating circuit to enable the latter whereby simultaneous application of the second interrogation pulse to another input of said gating circuit is effective to produce a trigger pulse at the output of said gating circuit; and a transmitter, said trigger pulse being applied to the modulator of said transmitter to energize the later thereby to generate an artificial echo signal in response to said double-pulse interrogation signal.

In designing the beacon according to the invention, particular attention was directed to the decoder, a major requirement of which, as has been noted, is a high degree of stability since the key to its operation is the preselected time delay in the production of the gate. This requirement which is aggravated by the fact that the beacon is operated remotely by means of the interrogation signals is thus met by making the timing of the gate relatively independent of both the supply voltages and the environmental conditions under which the beacon operates. To this end in the decoder incorporated in the beacon according to the present invention the time at which the gate is produced is made dependent upon only two components, namely a capacitor and an inductor, both of which are available with high temperature stability and which are connected in series in the gate-forming network. With this design high accuracy and stability are achieved because the operation of the timing components, i.e. the capacitor and inductor, are independent of circuit parameters thus providing a high degree of temperature stability and a minimum of delay jitters.

Other features which may be included in accordance with the invention will be described hereinafter and referred to in the appended claims.

The invention will now be more particularly described with reference to the accompanying drawings in which:

FIGURE 1 is a block schematic diagram of the functional units comprising the beacon; and FIGURE 2 is a circuit diagram of the beacon.

Referring to the block schematic diagram (FIGURE 1) it will be seen that the beacon comprises six major functional units, namely a preselector 10, a crystal detector 12, a video-amplifier 14, a decoder 16, a modulator 18, and a transmitter 20. The double pulse interrogation signals from the radar are applied to the crystal detector 12 after selection by the preselector 10 which latter preferably comprises a conventional band-pass filter effective to restrict the signals passed to the receiver to those within a specified frequency band which in the present case is the S-band. This preselector is necessary in order to prevent over-interrogation of the beacon by high power radars operating at frequencies other than the beacon interrogation frequencies. In addition the preselector permits a single antenna to be used for both reception and transmission. The pulse signals passed by the preselector are detected by the crystal detector 12 and amplified by the wide-band video-amplifier 14. The output of amplifier 14 is fed to the decoder 16 which produces a trigger pulse for the modulator 18 when a second interrogation pulse is received coincident with a gate pulse of predetermined length formed in response to the first interrogation pulse. The output of the modulator is used to activate the transmitter 20.

The preselector or band-pass filter 10 is thus used to restrict the signals which reach the beacon receiver to those within the preselected band of frequencies. The double-pulse interrogation signals from the associated radar are received by any suitable S-band antenna which may be a half-λ antenna 22 provided with a D.C. short which may be provided by the antenna or as shown by a ¼ wavelength shorted stub 24 which allows for a 50 micro amp. D.C. bias current, provided by resistor R1, for the crystal detector 12 thereby increasing the sensitivity of the detector.

The detector 12 produces a positive pulse output which is coupled by capacitor C2 and voltage divider R2 and R3 to the input of the transistor video-amplifier 14. The video-amplifier 14 employs three cascaded direct coupled common emitter stages T1, T2 and T3, followed by a common collector stage T4. The amplifier is directly coupled without the use of any inter-stage impedance matching devices. Each of the common emitter stages is biased by a series emitter resistor R5, R7 and R9 respectively, each of these bias resistors being by-passed for signal frequencies by a capacitor C3, C4 and C5 respectively. In the circuit shown the parameters of the amplifier circuit are chosen so that when the input applied to the crystal detector 12 is —40 dbm the output of the amplifier is a negative video-pulse 1 volt in amplitude with a signal to noise ratio of 5:1 and a rise time of 0.2 microsecond.

The output of the amplifier is fed to the decoder which consists essentially of a gate-forming network followed by an "and" gating circuit. The decoder also includes a transistor inverter stage T5 coupled to the last amplifier stage by means of capacitor C6 and resistor R19 and a switching stage consisting of a PNPN controlled junction rectifier T6, the output of which is fed to the gate-forming circuit comprising inductor L1 and capacitor C8. The first of the two negative interrogation pulses, after amplification by video-amplifier 14, is inverted by T5 and applied to the gate electrode of T6 to trigger the latter. The switching stage T6 is operable to produce a step-function at the junction of L1 and C8. The amplitude of the step-function is equal to the negative supply voltage less the drop across T6 and diode D1 and the voltage developed on C8 during the turn-on time of approximately 0.15 microsecond of T6. The step-function decays to approximately zero in the time $\pi\sqrt{LC}$ seconds. When the step-function has decayed to zero, the voltage across C8 reaches a maximum value and the charging current through T6 and diode D1 drops to zero turning off T6. The resistor R13 is dimensioned to maintain the current through T6 below its stay-alive value. During the second half-cycle of the period formed at the resonant frequency of L1 and C8 the current through L1 and C8 reverses because of the energy stored in L1, resulting in the formation of a negative pulse across R14 which at zero time, because of the charge on C8, has a D.C. level approximately equal to the negative supply voltage. The diode D1 remains conducting and controls the rise time of the negative pulse across R14 until the magnitude of this pulse is such as to reverse bias diode D1 thereby to render diode D1 non-conducting. Diode D1 now functions to prevent L1 from discharging through T6. Simultaneously the negative pulse is effective to forward bias diode D2 which is rendered conductive whereafter the energy stored in L1 is partially dissipated through diode D2 and across resistor R16 to produce a delayed gate pulse less than $\pi\sqrt{LC}$ seconds wide. The delayed output pulse may be varied in delay in the range from about 2.0 microseconds to about 8.0 microseconds by varying the value of L1. The delayed gate pulse is applied to the base of T8 by means of capacitor C9 and resistor R17. When the delayed gate pulse is formed, sufficient energy is dissipated to eliminate the possibility of T6 being re-triggered. The reverse bias on diode D2 prevents the initial waveform across R14 from acting as a gate on T8 but diode D2 is rendered conductive to permit the delayed gate pulse that is formed at time $\pi\sqrt{LC}$ seconds to be passed thereby.

The width of the gate may be reduced to less than $\pi\sqrt{LC}$ seconds by connecting an inductor in series with L1 and shunting a diode across this inductor with the result that the inductor is shorted during the time that the gate is being formed. An alternative method of reducing the width of the gate would be to short resistor R16 with an appropriate inductor.

The delayed gate pulse from T6 is applied to the base of T8 and permits the formation of a positive trigger pulse at the collector of the gating circuit transistor T7 upon application of the negative pulse output of T4 to the base of T7 in response to the second interrogation pulse. The trigger pulse output of T7 is coupled to the gate electrode of a high power controlled junction rectifier T9 forming part of the circuit of the modulator 18 used to activate the micro-wave transmitter 20. The modulator circuit also includes a resonant voltage doubler, a storage capacitor C11 and a high voltage pulse transformer TR1. When, as in the embodiment shown, a battery supply B is used as the high voltage source instead of a D.C. to D.C. convertor with half-wave rectification, a relay operated switch S2 is placed in series with the battery to prevent runaway of T9 as a result of over-interrogation. The modulator is supplied from a resonant voltage doubler consisting of inductor L2 and capacitor C11 which charges C11 to approximately twice the battery supply voltage thereby reducing the high voltage requirements of the battery power supply B.

When T9 is triggered as a result of receipt of the second interrogation pulse from T7 the charge on C11 is transferred via T9 to the pulse transformer TR1. Here a video-pulse is formed and is stepped-up by pulse transformer TR1 to approximately 1000 volts to activate the micro-wave transmitter 20 which is a miniature S-band oscillator and consists of a triode ceramic vacuum tube operated in a resonant cavity as a pulse anode RF oscillator. The transmitter is effective to generate artificial echo signals in response to the received double-pulse interrogation signals. The frequency of the transmitter is adjustable over a desired range, which in the example considered is from 2700 to 3000 megacycles, by means of a variable capacitor associated therewith. The RF output energy from the micro-wave oscillator is taken from the cavity by an adjustable capacitance probe and is radiated by means of any suitable S-band antenna.

A switch $S_1$ connects battery A to the apparatus in order to place it in operation, switch $S_1$ being controlled by any suitable means conventional in the art.

I claim:
1. A beacon operable to generate an artificial echo in response to interrogation signals received from a radar associated therewith comprising means for receiving and detecting said interrogation signals; a decoder, said decoder including a gate-forming network operable to produce a delayed pulse in response to the application thereto of the first of said interrogation signals and a gating circuit, said delayed pulse being applied to one input of said gating circuit to enable the latter whereby simultaneous application of a second interrogation signal to another input of said gating circuit is effective to produce a trigger pulse at the output of said gating circuit; and a transmitter, said trigger pulse being applied to the modulator of said transmitter to energize the latter thereby to generate an artificial echo signal in response to said interrogation signals, said decoder also including a solid state switching device, said first interrogation signal being applied to the gate electrode of said switching device, said switching device operable by said first interrogation signal to apply a step-function voltage across said gate-forming network whereby the latter produces said pulse delayed in time with respect to said first interrogation signal.

2. A device as claimed in claim 1 wherein said gate-forming network comprises a serially connected inductance and capacitance, said capacitance being charged during the first half-cycle of the period formed at the resonant frequency of said inductance-capacitance circuit and the energy stored in said inductance-capacitance circuit being discharged during the second half-cycle of the period formed at the resonant frequency of said circuit to produce said pulse delayed in time with respect to said first interrogation signal.

3. A beacon as claimed in claim 1 wherein said interrogation signals comprise double-pulse coded signals.

4. A beacon as claimed in claim 1 wherein said interrogation signals comprise double-pulse coded signals having a time interval of three microseconds between the leading edges of the double-pulse.

5. A beacon operable to generate an artificial echo in response to a double-pulse interrogation signal received from a radar associated therewith comprising means for receiving and detecting said interrogation signal; a decoder, said decoder including a solid state switching device, a gate-forming network operable to produce a delayed pulse in response to the application thereto of the first of said interrogation pulses and a gating circuit, said first interrogation pulse being applied to the gate electrode of said switching device, said switching device operable by said first interrogation pulse to apply a step-function voltage across said gate-forming network whereby the latter produces said delayed pulse, said delayed pulse being applied to one input of said gating circuit to enable the latter whereby simultaneous application of the second interrogation pulse to another input of said gating circuit is effective to produce a trigger pulse at the output of said gating circuit; and a transmitter, said trigger pulse being applied to the modulator of said transmitter to energize the latter thereby to generate an artificial echo signal in response to said double-pulse interrogation signal.

6. A beacon as claimed in claim 5 wherein said gate-forming network comprises a serially connected inductance and capacitance, said capacitance being charged during the first half-cycle of the period formed at the resonant frequency of said inductance-capacitance circuit and the energy stored in said inductance-capacitance circuit being discharged during the second half-cycle of the period formed at the resonant frequency of said circuit to produce said pulse delayed in time with respect to said first interrogation pulse.

7. A signal generating circuit arrangement adapted to produce an output signal in response to the receipt of a double-pulse interrogation signal, said circuit arrangement including means for receiving and detecting said interrogation signals; a gate-forming network operable to produce a delayed pulse in response to the application thereto of the first of said interrogation pulses; a gating circuit, said delayed pulse being applied to one input of said gating circuit to enable the latter whereby simultaneous application of the second interrogation pulse to another input of said gating circuit is effective to produce a trigger pulse at the output of said gating circuit; and a transmitter, said trigger pulse being applied to the modulator of said transmitter to drive the latter thereby to transmit a signal in response to said double-pulse interrogation signal, said gate-forming network comprising a serially connected inductance and capacitor.

8. A circuit arrangement as claimed in claim 7 including means for producing a step-function voltage at the junction of said inductance and capacitor in response to receipt of said inverted first interrogation pulse, said step-function voltage effective to drive a current through said inductance and capacitor to charge said capacitor, the current through said inductance and capacitor reversing upon decay of said step-function voltage to discharge the energy stored in said inductance and capacitor thereby to produce said delayed pulse.

9. A circuit arrangement as claimed in claim 7 wherein said interrogation signal comprises a double-pulse signal having a time interval of three microseconds between the leading edges of the double pulse.

10. A circuit arrangement as claimed in claim 7 including means for amplifying said interrogation signal, means for inverting the first of said interrogation pulses, and means for applying said amplified and inverted first interrogation pulse to said gate-forming network, said means comprising a controlled junction rectifier, said amplified and inverted interrogation pulse being applied to the gate electrode of said rectifier to turn on the latter and thereby initiate operation of said gate-forming network.

11. A beacon operable to generate an artificial echo in response to a double-pulse interrogation signal received from a radar associated therewith, said beacon comprising means for receiving and detecting said interrogation signal, a decoder, and a transmitter, said decoder consisting of a gate-forming network responsive to the first pulse of the double-pulse interrogation signal to produce a gate pulse delayed in time to coincide with the second interrogation pulse and a gating circuit adapted to be enabled by said gate pulse and operable in response to said second interrogation pulse, when the latter is coincident with said gate pulse, to apply a trigger pulse to the modulator of the transmitter thereby to cause the latter to generate an artificial echo signal in response to said double-pulse interrogation signal, said gate-forming network including an inductance and a capacitor connected in series and operable to produce a delayed pulse in response to the application thereto of the first of said interrogation pulses.

12. A beacon as claimed in claim 11 including a solid state switching device, said first interrogation pulse being applied to the gate electrode of said switching device which latter is operable thereby to apply a step-function voltage across said gate-forming network whereby the latter produces said delayed pulse.

13. A beacon as claimed in claim 11 wherein said interrogation signal comprises a double-pulse signal having a time interval of three microseconds between the leading edges of the double-pulse.

14. A beacon as claimed in claim 11 including rectifier means operable to prevent discharge of the energy stored in said inductance-capacitor circuit through said switching device upon decay of said step-function voltage.

15. In a beacon operable to generate an artificial echo in response to a double-pulse interrogation signal received from a radar associated therewith a decoder, said decoder comprising a solid state switching device, a gate-forming network, and a gating circuit, said first interrogation pulse being applied to the gate electrode of said switching device, said switching device operable by said first interrogation pulse to apply a step-function voltage across said gate-forming network whereby the latter produces a pulse delayed in time with respect to said first interrogation pulse, said delayed pulse being applied to one input of said gating circuit to enable the latter whereby simultaneous application of the second interrogation pulse to another input of said gating circuit is effective to produce a trigger pulse at the output of said gating circuit.

16. In a beacon operable to generate an artificial echo in response to a double-pulse interrogation signal received from a radar associated therewith a decoder, said decoder comprising a solid state switching device, a gate-forming network, said gate-forming network comprising a serially connected inductance and capacitor, and a gating circuit, said first interrogation pulse being applied to the gate electrode of said switching device, said switching device operable by said first interrogation pulse to apply a step-function voltage across said gate-forming network whereby the latter produces a pulse delayed in time with respect to said first interrogation signal, said delayed pulse being applied to one input of said gating circuit to enable the latter whereby simultaneous application of the second interrogation pulse to another input of said gating circuit is effective to produce a trigger pulse at the output of said gating circuit.

17. Apparatus as claimed in claim 15 wherein said gate-forming network comprises a serially connected inductance and capacitance, said capacitance being charged during the first half-cycle of the period formed at the resonant frequency of said inductance-capacitance circuit and the energy stored in said inductance-capacitance circuit being discharged during the second half-cycle of the period formed at the resonant frequency of said circuit to produce said pulse delayed in time with respect to said first interrogation signal.

18. In a beacon operable to generate an artificial echo in response to a double-pulse interrogation signal received from a radar associated therewith, a decoder, said decoder comprising a gate-forming network operable to produce a delayed pulse in response to the application thereto of the first of said interrogation pulses and a gating circuit, said delayed pulse being applied to one input of said gating circuit to enable the latter whereby simultaneous application of the second interrogation pulse to another input of said gating circuit is effective to produce a trigger pulse at the output of said gating circuit, said gate-forming network comprises a serially connected inductance and capacitance, said capacitance being charged during the first half-cycle of the period formed at the resonant frequency of said inductance-capacitance circuit and the energy stored in said inductance-capacitance circuit being discharged during the second half-cycle of the period formed at the resonant frequency of said circuit to produce said pulse delayed in time with respect to said first interrogation signal.

19. Apparatus as claimed in claim 18, wherein said interrogation signal comprises a double-pulse signal having a time interval of three microseconds between the leading edges of the double pulse.

No references cited.

CHESTER L. JUSTUS, *Primary Examiner.*

D. C. KAUFMAN, *Assistant Examiner.*